Patented Jan. 16, 1940

2,186,960

UNITED STATES PATENT OFFICE 2,186,960

POLYISOPROPYL HALOBENZENES

Robert R. Dreisbach and George Beal Heusted, Midland, Mich., assignors to The Dow Chemical Company, Midland, Mich., a corporation of Michigan No Drawing. Application April 26, 1937, Serial No. 139,020

5 Claims. (Cl. 260—650)

This invention relates to certain new organic products consisting essentially of halogenated benzene derivatives having the generic formula:

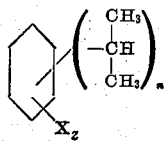

wherein X is a halogen, $n$ is an integer greater than 1 and lower than 6, $z$ is an integer less than 5, and the sum of $n$ and $z$ is not greater than 6. Such compounds are hereinafter referred to as "polyisopropyl halobenzenes." The products are, in most instances, mixtures of isomeric compounds having the above generic formula, although individual compounds may sometimes be obtained. All of the products are useful as organic solvents and as dielectric agents, and certain of them are adapted to special uses, e. g., as intermediates in the manufacture of dyes, etc.

Our new products may be prepared by reacting a halobenzene containing not more than four halogen atoms per molecule with propylene or an isopropyl halide in the presence of a Friedel-Crafts catalyst. They may also be prepared by reacting a polyisopropyl benzene with a halogen in the presence of a nuclear halogenation catalyst.

The invention, then, consists of the new polyisoproyl halobenzene products hereinafter fully described and particularly pointed out in the claims.

In preparing our new products by the reaction of propylene with a halo-benzene containing not more than four halogen atoms per molecule, the latter and between 0.03 and 0.15 molecular equivalent of aluminum chloride or other Friedel-Crafts catalyst are placed in a closed reactor provided with an agitator. Propylene or an isopropyl halide is then introduced at moderate pressure, e. g., 0–100 pounds per square inch gauge, while agitating and maintaining the mixture at a temperature between 0° and 100° C. Operation in such manner is continued until propylene sufficient to produce the desired polyisopropyl halobenzene has been added. Introduction of the proylene is then discontinued and the mixture is allowed to stand for some time, e. g., 0.5 hour or longer. During this period a heavy sludge layer containing the catalyst usually settles to the bottom of the reactor and is drawn off for re-employment as catalyst in subsequent reactions. The clear supernatant layer is washed with water, neutralized with an aqueous alkali, and dried. For some purposes this dried product may be used without further treatment. Usually, however, it is fractionally distilled to separate the desired polyisopropyl halobenzene product.

In preparing our new products by reaction of a halogen with a polyisopropyl benzene containing not more than five isopropyl groups per molecule, the polyisopropyl benzene is mixed with a small proportion of a nuclear halogenation catalyst, e. g., iron filings. The mixture is agitated and maintained at room temperature or slightly below, while a halogen is added slowly thereto until the desired degree of halogenation has been attained. Addition of the halogen is then discontinued and the mixture is washed with water, neutralized with aqueous alkali, dried, and fractionally distilled to separate the desired polyisopropyl halobenzene product.

Our new products are usually water-white liquid mixtures of isomeric compounds having properties so similar that separation of the individual compounds is extremely difficult, if not impossible. In certain instances, however, crystalline substances are obtained by careful fractional crystallization of the liquid products.

The following examples illustrate several ways in which the principle of the invention has been applied, but are not to be construed as limiting the invention:

Example 1

A mixture of 406 grams of diisopropyl benzene and 20 grams of iron filings was agitated and maintained at a temperature of about 10° to 15° C., while 248 grams of gaseous chlorine was added thereto during 8 hours. When the addition of chlorine was complete, the reaction product was washed with water and with aqueous alkali, dried, and fractionally distilled. The fractions distilling at temperatures between 162° and 166° C. at 95 millimeters pressure and between 179° and 184° C. at 93 millimeters pressure were collected. The 162° to 166° C. fraction was redistilled, whereby 107 grams of a liquid mixture of isomeric diisopropyl monochlorbenzenes having a boiling point of about 236.4° C. at 748 millimeters pressure and a specific gravity of about 0.981 25°/25° C. was obtained. On redistillation of the 179° to 184° C. fraction from the original distillation 208 grams of a liquid mixture of isomeric diisopropyl dichlorbenzenes, having a boiling point of about 210° C. at 199 millimeters and a specific gravity of about 1.105 25°/25° C. was recovered. Additional properties of these diisopropyl chlorbenzene products are given in Table I.

Example 2

A mixture of 400 grams of triisopropyl benzene, and 20 grams of iron filings was agitated and maintained at a temperature of about 10° to 15° C., while 480 grams of liquid bromine was added thereto during 1.0 hour. When the addition of bromine was complete, the reaction product was washed with water, neutralized with aqueous alkali, dried, and fractionally distilled. The fractions distilling at temperatures between 193° and 197° C. at 93 millimeters pressure and between 225° and 230° C. at 90 millimeters pressure were collected. The 193° to 197° fraction was redistilled, whereby 280 grams of a liquid mixture of isomeric triisopropyl brombenzenes having a boiling point of about 202.8° C. at 111 millimeters pressure and a specific gravity of about 1.1368 25°/25° C. was obtained. On redistillation of the 225° to 230° C. fraction from the original distillation, 203 grams of a liquid mixture of isomeric triisopropyl dibrombenzenes having a boiling pont of about 232.5° C. at 96.5 millimeters and a specific gravity of about 1.3911 25°/25° C. was recovered. Additional physical properties of these triisopropyl brombenzenes are given in Table I.

Example 3

A mixture of 20.0 pounds of monochlorbenzene and 1.0 pound of anhydrous aluminum chloride in a closed reactor was stirred and maintained at a temperature of 40° to 45° C. while 13.8 pounds of gaseous propylene at a pressure of about 20 pounds gauge was passed thereinto during 1.2 hours. When the addition of propylene was complete, the reaction mixture was allowed to settle for 0.5 hour. The supernatant liquid was then withdrawn, washed with water, neutralized with aqueous alkali, dried, and fractionally distilled. The fraction boiling at temperatures between 158 and 160° C. at 94 millimeters pressure was collected. This 158° to 168° fraction was redistilled, whereby 3.16 pounds of a liquid mixture of isomeric diisopropyl monochlorbenzenes having a boiling point of 158° to 160° C. at 94 millimeters pressure and a specific gravity of about 0.9810 at 25°/25° C. was recovered. Additional properties of this product are given in Table I.

Table I lists a number of new polyisopryl halobenzene products prepared in accordance with the invention and gives properties of each.

Other modes of applying the principle of our invention may be employed, change being made as regards the details herein disclosed, provided the products stated by any of the following claims or the equivalent of such stated products be employed.

We therefore particularly point out and distinctly claim as our invention:

1. A liquid mixture of isomeric polyisopropyl halobenzenes having the generic formula:

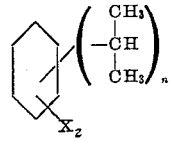

wherein X is a halogen, $n$ is an integer greater than 1 and lower than 6, $z$ is an integer lower than 5, and the sum of $n$ and $z$ is not greater than 6.

2. A liquid mixture of isomeric polyisopropyl chlorbenzenes having the generic formula:

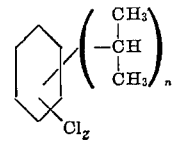

wherein $n$ is an integer greater than 1 and lower than 6, $z$ is an integer lower than 5, and the sum of $n$ and $z$ is not greater than 6.

3. A liquid mixture of isomeric polyisopropyl brombenzenes having the generic formula:

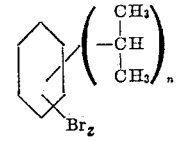

wherein $n$ is an integer greater than 1 but lower than 6, $z$ is an integer lower than 5, and the sum of $n$ and $z$ is not greater than 6.

4. A liquid mixture of diisopropyl dichlorbenzenes having a boiling point of about 262° to 264° C. at 744 millimeters pressure and a specific gravity of about 1.105 25°/25° C.

5. A mixture of triisopropyl monochlorbenzenes having a boiling point of about 262° at 729 millimeters pressure and a specific gravity of about 0.962 25°/25° C.

Table I

| Product | Boiling point, °C. | Freezing point, °C. | Specific gravity 25°/25° C. | Refractive index 25° C. | Viscosiy 100° F., millipoises |
|---|---|---|---|---|---|
| Diisopropyl monochlorbenzene | 237.0 to 238.6 at 744 mm | Below −60 | 0.9839 | 1.5079 | 19.2 |
| Diisopropyl monochlorbenzene (isomer) | 235.7 to 237.0 | Viscous at −64 | 0.9810 | 1.5060 | 18.5 |
| Diisopropyl dichlorbenzene | 262 to 264 at 743.7 mm | Stiff at −45 | 1.1052 | 1.5271 | 37.5 |
| Diisopropyl trichlorbenzene | 290.5 to 294.0 at 743.7 mm | Stiff at −30 | 1.2305 | 1.5476 | 92.6 |
| Diisopropyl tetrachlorbenzene | 234 at 96 mm | 90 | | | |
| Diisopropyl monobrombenzene | 178.9 at 111 mm | Viscous at −50 | 1.1918 | 1.5258 | 28.3 |
| Diisopropyl dibrombenzene | 211.4 at 99 mm | 48.5 | 1.47 | | |
| Diisopropyl dibrombenzene (isomer) | 211.4 at 99 mm | 17.0 | 1.4729 | 1.5507 | 78.4 |
| Triisopropyl monochlorbenzene | 261.7 at 729 mm | Viscous at −35 | 0.9621 | 1.5058 | 39.7 |
| Triisopropyl dichlorbenzene | 287.7 at 738.6 mm | Stiff at −5 | 1.0703 | 1.5250 | 143.6 |
| Triisopropyl monobrombenzene | 202.8 at 111 mm | Stiff at −30 | 1.1368 | 1.5214 | 69.4 |
| Triisopropyl dibrombenzene | 232.5 at 96.5 mm | 16 | 1.3911 | 1.5552 | 333.0 |

ROBERT R. DREISBACH.
GEORGE BEAL HEUSTED.